United States Patent [19]

Eleneke

[11] Patent Number: 5,340,144
[45] Date of Patent: Aug. 23, 1994

[54] DYNAMIC FLUID ENGAGING SURFACE FOR VEHICLES

[76] Inventor: Charles L. Eleneke, 617 S. Sweetzer Ave., Los Angeles, Calif. 90048

[21] Appl. No.: 958,498

[22] Filed: Oct. 8, 1992

[51] Int. Cl.5 .......................................... B62B 13/06
[52] U.S. Cl. ..................... 280/609; 114/270; 114/288; 280/14.2; 280/18; 441/79
[58] Field of Search ............... 441/68, 74, 79; 114/56, 114/61, 270, 288, 289; 280/14.2, 18, 609, 28, 28.16

[56] References Cited

U.S. PATENT DOCUMENTS

| | | | |
|---|---|---|---|
| 2,139,513 | 8/1938 | Nelson et al. | 280/18 |
| 2,464,957 | 3/1949 | Wood | 114/61 |
| 2,950,701 | 8/1960 | De Stefani | 114/61 X |
| 3,101,692 | 8/1963 | Snow | 114/61 |
| 3,169,779 | 2/1965 | Haab | 280/18 |
| 3,199,887 | 8/1965 | McKelvey | 280/18 |
| 3,372,945 | 3/1968 | Salisbury | 280/18 |
| 3,374,003 | 3/1968 | Fulsom | 280/18 |
| 3,635,490 | 1/1972 | Demaree et al. | 280/18 |
| 3,782,745 | 2/1974 | Stoveken | 280/18 |
| 3,900,204 | 8/1975 | Weber | 280/14.2 |
| 4,086,863 | 5/1978 | Nitzki et al. | 114/61 |
| 4,533,150 | 8/1985 | Hardy | 280/14.2 |
| 4,561,664 | 12/1985 | Cashmere | 280/18 |
| 4,603,870 | 8/1986 | Monreal | 280/18 |
| 4,666,171 | 5/1987 | Sellers | 280/18 |
| 4,678,445 | 7/1987 | Monreal | 331/72 |
| 4,702,186 | 10/1987 | Tiede | 114/61 X |
| 4,850,913 | 7/1989 | Szabad, Jr. | 441/65 |
| 4,909,524 | 3/1990 | Paine | 280/18 |
| 4,928,983 | 5/1990 | Maass | 280/18 |
| 5,018,760 | 5/1991 | Remondet | 280/14.2 X |
| 5,120,249 | 6/1992 | Fonda | 114/61 X |

FOREIGN PATENT DOCUMENTS

| | | | |
|---|---|---|---|
| 902682 | 6/1972 | Canada | 305/32 |
| 466836 | 11/1951 | Italy | 114/288 |
| 52-43240 | 5/1977 | Japan | B62B 13/14 |
| 1000328A | 2/1983 | U.S.S.R. | |

Primary Examiner—Margaret A. Focarino
Assistant Examiner—Michael Mar
Attorney, Agent, or Firm—Merchant & Gould

[57] ABSTRACT

A vehicle for travel on snow or water consisting of an elongated main member having a top and a bottom surface with a venturi effect. First and second runners extend lengthwise and downwardly along opposed edges of the bottom surface from a point spaced rearwardly of the front end of the member to a point spaced forwardly of the rear end of the member. The runners and bottom surface define the venturi section that tapers inwardly to a narrow throat in the vicinity of the middle of the member and then tapers outwardly. Elongated side cuts are provided to the elongated outside surfaces of the board, the side cuts creating a surface which is narrower in width between the front and the back of the surface.

18 Claims, 3 Drawing Sheets

DYNAMIC FLUID ENGAGING SURFACE FOR VEHICLES

Having a surface for vehicles to slide or move on a surface with improved dynamics and stability is valuable.

This invention relates to boards for use on ski slopes. The invention also concerns water skis, runners for snowmobiles, skiplanes, jet-skis and hulls of other watercrafts.

BACKGROUND

Current surfaces for vehicles, such as snowboards, have several disadvantages. Firstly, they are difficult to control and turn. Their flat and/or convex bottom make these boards controllable only with precision balance and use of substantial upper body strength. Even when known boards are handled by an expert, well-conditioned rider, they still may not maneuver with precision.

Known boards also lack speed. This is because their flat and convex bottoms have a substantial area which creates friction and drag.

Similarly, the water engaging surface of a hull for water vehicles is also not as efficient dynamically and from a stability viewpoint, as possible.

There is a need to provide an improved dynamic fluid engaging surface for use on snow, ice and water.

SUMMARY

The present invention seeks to minimize the shortcomings of known snow and water vehicles, such as snowboards and jet skis.

According to the invention the snow or water engaging surface of a vehicle includes a concave bottom. There are longitudinal extending outrigger runners depending from the bottom surface. The concave bottom forms a venturi configuration axially directed from front to back, with the throat of the venturi located towards the longitudinal center of the surface relative to the front and back of the surface. This reduces drag and increases surface purchase and speed in turns and maneuvers.

In a preferred form of the invention, the outrigger runners are bevelled into the center of the bottom surface directly distributing rider loads to the board's outer perimeter.

In further forms of the invention, the outer edges are hardened with metal edges and extend at least the greater part of the length of both sides to provide surface purchase and speed on snow and ice and increase board maneuverability.

DESCRIPTION

Figure 1:
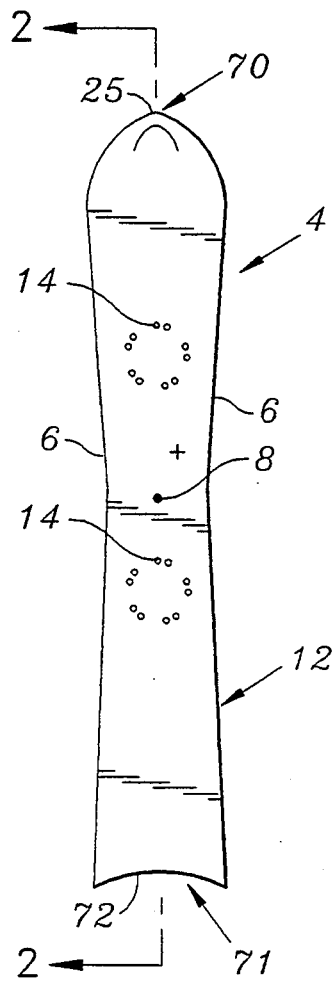
FIG. 1 shows a top view of a board of the present invention.
Figure 3:
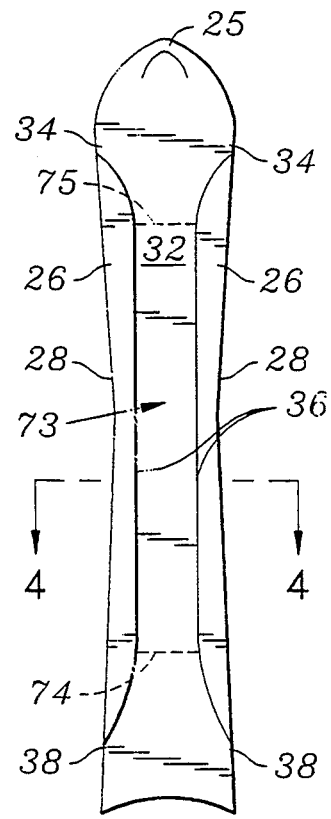
FIG. 3 shows a bottom view of the board.

FIG. 1 shows a top view of a board 4 useful for snowboarding. The board 4 has a pointed tip 25, which bends upwardly at the front 70, and a long narrow body 12. The long narrow body 12 has opposite sides 6. These are cut in to slant inwardly until the mid area, or off-centered from apex 8 of the body 12 and then slant outward to the back 71 of the body 12. The back face 72 at the back 71 of the body 12 has an elliptical shape. The body 12 has two sets of spaced screw holes 14 for attaching a binding or boot. The boots are worn by a rider and the bindings or boots are attached to the screw holes 14 by screws to hold the rider on the board 4.

Figure 2A:
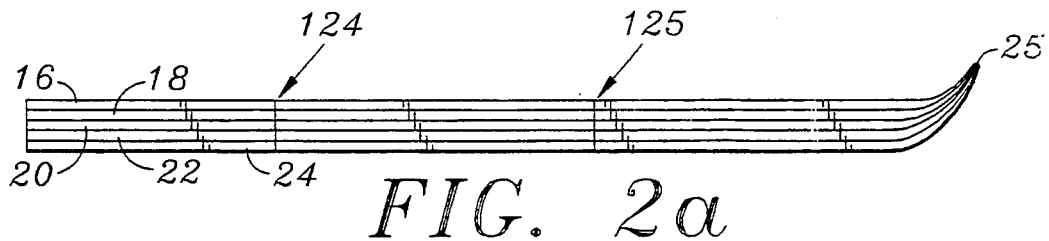
FIG. 2a illustrates a cross section of FIG. 1 taken along line 2—2.
Figure 2B:
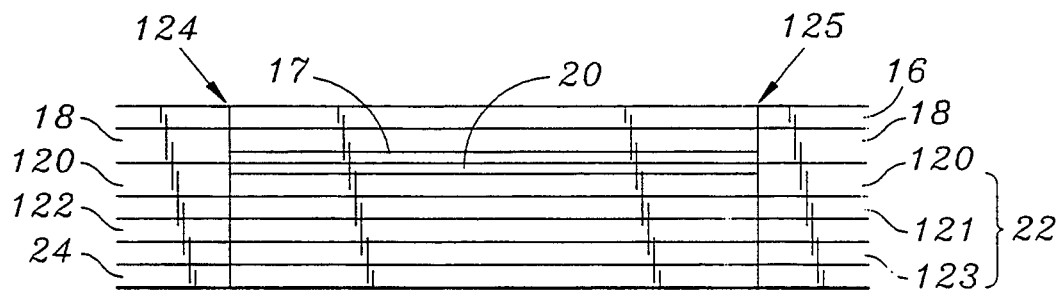
FIG. 2b illustrates the layers of the board from top to bottom.
Figure 4:
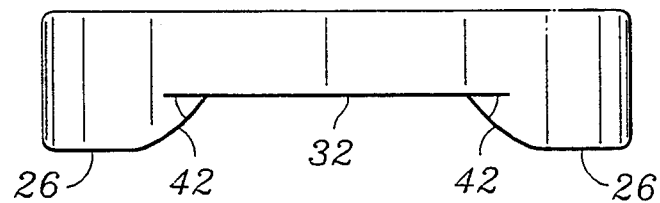
FIG. 4 is a cross-sectional view of the board along the line 4—4 of FIG. 3.
Figure 5:
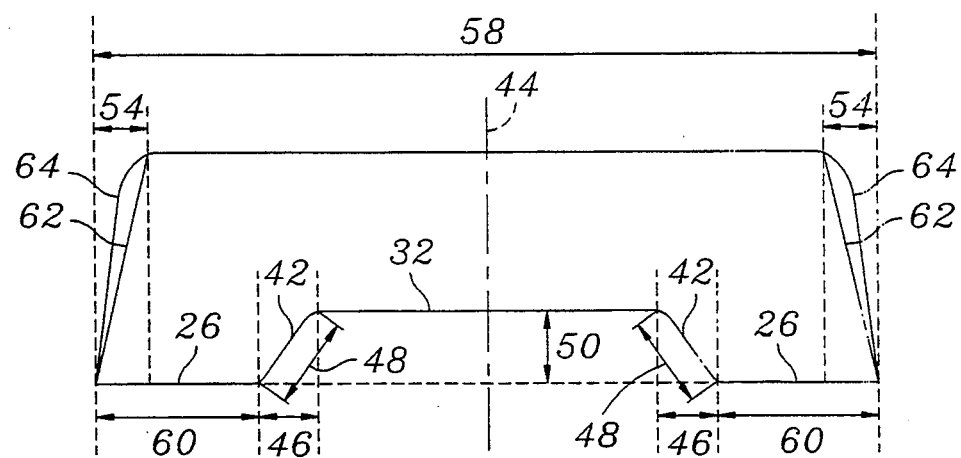
FIG. 5 illustrates a cross-sectional view of the core of the board of the present invention in more detail than FIG. 4.

FIGS. 2a and 2b show a cross section of FIG. 1 along the line 2—2. The board 4 includes nine layers of material at its core, and seven layers in the non-core portion. The top layer 16 is made of ABS plastic. Layer 18 is below layer 16 and is made of fiber glass. Next layer 17 is a neoprene rubber which extends preferably only between locations 124 and 125, namely, the length of the core. The next layers 16, 18, 120, 121, 122 and 123 extend essentially for the entire length of the board between the front 70 and back 71. Layer 20 is made of wood and is beneath layer 17 and is also of a core length namely extending between lines 124 and 125 which define the core. The next four layers, collectively 22, are made successively of rubber 120, fiber glass 121, ABS plastic 122, and fiber glass 123. The layers 22 extend from the front 70 to the back 71.

A bottom layer 24 is a plastic material. Layer 24 may also be made of wood, fiber glass, metal, injection molding of plastics or other liquefiable or moldable material that forms to desired dimensions or any other applicable materials or combination of material which can be made to conform to the configuration of the bevel running surface or shape. All the layers are sealed together through the use of a two-part epoxy resin.

Where metal edges are used, the following different layers are used from the top to bottom of the board:

ABS plastic (125)
ABS, Fiberglass, and Aluminum Filler Pieces (18)
Rubber (17) (length of core 124 to 125)
Wood (20) (length of core 124 to 125)
Neoprene Rubber (20)
4 oz. Fiberglass (121)
ABS (slit) (122)
4 oz. Fiberglass Strips (122)
Edges (Metal)
4 oz. Fiberglass (123)
P-Tex All the above layers are sealed with Coltana epoxy resin.

The bottom 32 of the board 4 has a pair of spaced outrigger runners 26, one along each lengthwise side 28. There is an upwardly bending nose 25 at the front 70. The end face 72 has an elliptical concave profile at its rear end 72. The outrigger runners 26 extend along the length 12 of the board 4 from about 1 to 10 inches from the nose to 1 to 10 inches from the edge of end face 72.

The bottom 32 is either flat or concave and joins the outrigger runners 26 with bevels 42. The outrigger runners 26 extend below the bottom 32 by bevel walls 42. The outrigger runners 26 extend from a point 34 spaced rearwardly from the tip 25 lengthwise along the sides 28 of the board to a point 38 spaced forwardly from the end 72. The outrigger runners 26 taper inwardly from the edges 34 and 38 respectively to a longitudinal line 36.

The bevels 42 are walls inclined at an angle and extend along the length of runners 26, tapering or flaring out to the sides 28 at points 34 and 38 to form a venturi passage 73. The walls 42 may be angled at from about 12 to about 50 degrees with respect to bottom 32 with an optimum range of angles from about 12 to about 35 degrees.

The venturi passage 73 is defined by the bottom 32 and walls 42 to the outriggers 26. The throat of the venturi 73 is located between lines 74 and 75 and thus extends over the greater length of the board 4. In some cases, the throat 23 can be shorter. The center of the throat may be located at, or ahead of, or behind the mid part 36 between the front 71 and back 72 of the board.

The width of the runners 26 is shown by numeral 60. The elevation 50 of the bevel varies starting from a depth of 0.16 inches. The elevation 50 depends upon the thickness or height of the board or vehicle at the midaxis 44 which may start about 0.364 inches. The horizontal projected width of walls 42 is shown by numeral 46 and the actual width of the angled walls 42 by numeral 48. The board 4 has curved, angled or inclined side walls 64 extending from the top surface to the bottom surface of runners 26. The horizontal projected width is represented by reference numeral 54. The linear dimension of the curved inclined side wall 64 from the top surface of the board to the bottom surface of the runners 26 is represented by numeral 62.

The dimensions of the board 4 or surface for a vehicle may vary dependent upon its use and the size and skill level of the user. A general board for normal use would have dimensions such as a length from front to back 71 of approximately 66½ inches; a thickness of approximately 0.5 inches; a width at the top of about 1.5 inches; a width at the point where the runners being of about 10.5 inches; a width at the midpoint of approximately 9 inches; a width at the bottom of approximately 10.5 inches; a distance of approximately from 1 to 12 inches from the end 30 of the board to the end 38 of the runners 26; a distance of approximately 10.5 inches from the tip 25 of the board to the beginning 34 of the runners 26; and a runner 26 length of approximately 44 inches.

The bottom 32 is optimally about 6½ inches in width and, if concave or cambered, has a 10 degree incline or angle in from and out to the edges of the bottom 32 along the length of the board from the front to the back. The camber or concavity provides for a smaller contact surface resulting in less friction, which in turn allows for more speed. This causes a hydroplane effect on hard-packed snow and ice and a venturi effect on powder, soft snow or fluid such as water.

The outrigger runners 26 are the two contact surfaces for the board and have an optimal maximum width at the mid area of the board 4 of approximately 1.25 inches. When in contact with the snow, the forward movement of the board forces snow through the front area 34 of the board into the venturi 73 between the runners 26 and the bottom 32. The snow is then forced through the throat of the venturi. The force of the snow exiting the narrow venturi throat at the midsection (off-centered apex) is greater than the force entering the narrow venturi throat from the front. This extra force allows for a large increase in speed, maneuverability and control. This venturi effect obtained from the described structure diminishes co-efficient drag and side slipping and causes acceleration through turns.

The inner bevelled walls 42 are part of the two outrigger type runners 26 which are the two contact surface areas for the board 4. The mid area of the venturi 73 bevel makes little or no contact with the snow or ice or other fluid which causes a hydroplane effect. When in contact with the snow or ice or other fluid, through gravity or any type of propulsion, it forces the snow or other fluid into the front area on the board.

The snow then passes through the throated mid area of the venturi which is smaller in width than both entry and exit areas. The bevel begins its 10 degrees to 30 degrees from the shoulder, preferably 10 degrees to 12 degrees on a longitudinal axis. The bevel extends approximately 1 inch to 15 inches or more from the front 70 and shoulder area depending on the length of the board 4 to the end 72. The width of the bevel is elevated in varying dimensions starting from 0.01 inches in depth to 5 inches or feet depending on the proportional venturi bevel size, but preferably .16 inches in depth at the waist. This depth depends on the thickness or height of the board at the mid area or waist, which varies from 0.364 inches to several inches or feet.

The overall width of the board begins at 1.5 inches and expands proportionately to and with the bevel. The bevel and runners can extend approximately ¾ to the entire length of the board on its longitudinal axis, but most preferably ¾ of its length.

The exit is an independent angle from the entry angle, but preferably the same, although not necessarily in conjunction with each other. The bevel can also be used on an asymmetrical plane, whereas from midpoint of bevel length 0 degrees to 30 degrees longitudinally offset axis for a left or right-handed rider. The deeper the bevel at the shoulder to nose, the closer the tip of the board is brought to the opening of the venturi bevel exposing more of tapered area which leads to the bevel causing less resistance. This is also true with the distance at the end of the bevel where it flares out at the rear end 72. The distance from the tip 25 of the front 70 to the bevel opening may vary from the distance from the end of the bevel 42 to the rear end 72, but is preferably the same.

Figure 6:
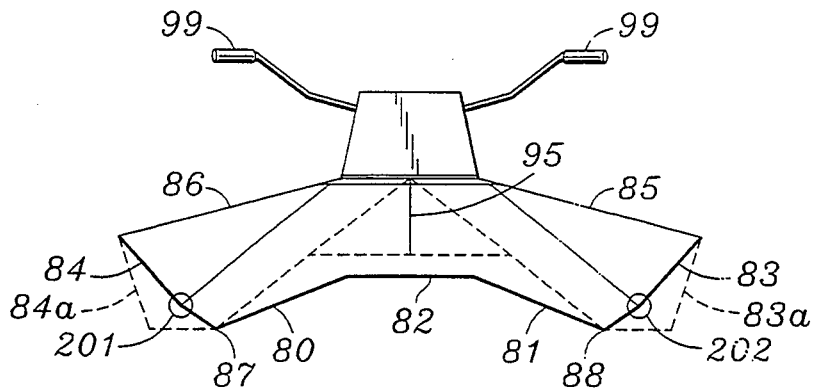
FIG. 6 is a cross-sectional view along lines 6—6.
Figure 7:
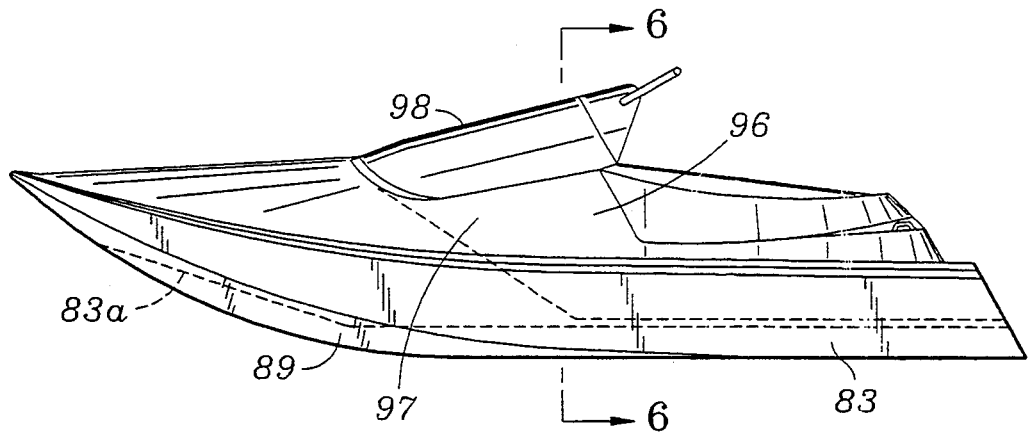
FIG. 7 is a side view of a jet ski.
Figure 8:
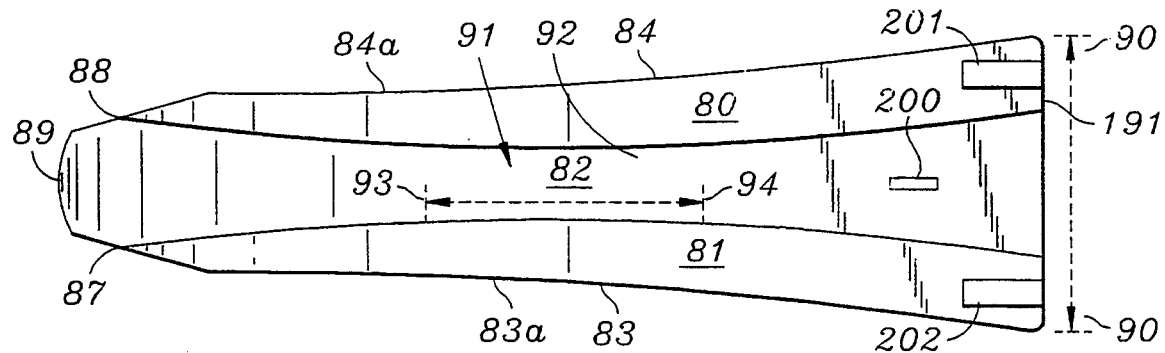
FIG. 8 is a bottom view of a jet ski.

The invention has application to either vehicles for moving on fluid, such as snow, ice and water. A jet ski, illustrated in FIG. 6, includes bevelled walls 80 and 81 directed inwardly to a flat bottom 82. The area defined between bevelled walls 80 and 81 and flat bottom 82 defines the passage for a venturi effect the jet ski. The outer walls 83 and 84 are the sides of the jet ski at the back, are curved in a concave form upwardly to the top surface 85 and 86 of the jet ski. The front portions of sides 83 and 84 are the runners 83a and 84a. The walls 83a and 84a interface with the ends 87 and 88 of bevelled walls 80 and 81 to be a relatively point contact at the forward end 89 along the center line 189 of the jet ski. The outer walls 83 and 84 are curved to concave inwardly as a side cut and flare outwardly to a greater distance 90 at the tail or rear 91 of the jet ski. The bottom face 82 includes a venturi configuration 91 with the throat 92 essentially formed between zones 93 and 94.

The engine compartment would be located centrally at locations 95, 96 and 97 generally. The steering arm 98 with handle bars 99 is located forwardly in a hinged manner. An optional fin 200 can be located on the base of the board 82. The output jets 201 and 202 could be located in the side runners adjacent to tail area 91 for the ski jet.

In other applications, the invention can be used as a hull for different water crafts such as a hydroplane, motor boat, snow ski or water ski. The essential bottom surface imparts a dynamic effect and stability to the fluid engaging surface. This is provided by the concave contact surface extending longitudinally at least part of the distance from front to back of the surface, and the at least partly venturi effect on the surface engaging base. This facilitates the movement of fluid past the surface engaging base in an enhanced manner.

In the configuration shown in FIGS. 2a and 2b for the board 4, the neoprene rubber 17 and wood 20 extends only between the length of the core, namely between points 124 and 125. This includes the venturi throat area and path inlet to the venturi and the outlet from the venturi. In different applications, different formats of layers and shapes of layers can be applied to the surface engaging body.

Many other forms of the invention exist for active and passive vehicles, each different from others in matters of detail only. The above description is intended by way of example only and is not intended to limit the present invention in any way except as set forth in the following claims.

I claim:

1. A vehicle for at least partly sliding travel on a fluid comprising an elongated member having a bottom surface and a front end and rear end and opposed sides, a pair of spaced runners extending at least partly along the length of opposed sides of the surface, said runners depending downwardly from the opposed sides below the bottom surface and being constructed and arranged relative to the bottom surface to define a venturi section between the front and rear of the member, the runners each having an outer wall extending between a leading end and a rear end, the outer wall being relatively concave between the leading end and the rear end, such concavity being directed towards the venturi section, and an inner wall configured to form a venturi passage having a converging forward section, a main section with substantially parallel inclined wall portions, and a diverging rearward section, a relatively pointed forward end to the elongated member, and the bottom surface of the elongated member being concave, such that during travel, essentially all of the bottom surface slidingly engages the fluid.

2. A vehicle as claimed in claim 1 wherein the elongated member includes side walls at the opposed sides, and wherein the side walls are relatively concave between the leading end and the rear end, the side walls being the outer wall of the runners.

3. A vehicle as claimed in claim 1 wherein the bottom surface has a width between about 1 inch to 10 inches between the runners at the mid area thereby defining a venturi throat.

4. A vehicle as claimed in claim 1 wherein the bottom surface has a width between of about 2 inches to 10 inches at the mid area.

5. A vehicle as claimed in claim 1 wherein the bottom surface has a concavity between the runners of about 5 degrees to 35 degrees.

6. A vehicle as claimed in claim 1 wherein the runners begin at a point rearwardly of the front end.

7. A board as claimed in claim 1 wherein the runners end inwardly of the rear end.

8. A board as claimed in claim 1 wherein the bottom surface is selectively equal or non-equal in width at locations where the spaced runners begin and end.

9. A vehicle as claimed in claim 1 wherein the bottom surface is used selectively for a vehicle for sliding on snow, ice or water and is selectively active or passive.

10. A vehicle for at least partly sliding travel on a fluid comprising an elongated member having a bottom surface and a front end and rear end and opposed sides, a pair of spaced runners extending at least partly along the length of opposed sides of the surface, and runners depending downwardly from the opposed sides below the bottom surface and being constructed and arranged relative to the bottom surface to define a venturi section between the front and rear of the member, the runners each having an outer wall extending between a leading end and a rear end, the outer wall being relatively concave between the leading end and the rear end, such concavity being directed towards the venturi section, an inner wall configured to form a venturi passage having a converging forward section, a main section with substantially parallel inclined wall portions, and a diverging rearward section, a relatively pointed forward end, and wherein the bottom surface is concave, such that during travel, essentially all of the bottom surface slidingly engages the fluid.

11. A vehicle as claimed in claim 10 wherein the elongated member includes side walls at the opposed sides, and wherein the side walls are relatively concave between the leading end and the rear end, the side walls being the outer wall of the runners.

12. A vehicle as claimed in claim 10 wherein the bottom surface has a width between about 1 inch to 10 inches between the runners at the mid area thereby defining a venturi throat.

13. A vehicle as claimed in claim 10 wherein the bottom surface has a width between of about 2 inches to 10 inches at the mid area.

14. A vehicle as claimed in claim 10 wherein the bottom surface has a concavity between the runners of about 5 degrees to 35 degrees.

15. A vehicle as claimed in claim 10 wherein the runners begin at a point rearwardly of the front end.

16. A board as claimed in claim 10 wherein the runners end inwardly of the rear end.

17. A board as claimed in claim 10 wherein the bottom surface is selectively equal or non-equal in width at locations where the spaced runners begin and end.

18. A vehicle as claimed in claim 10 wherein the bottom surface is used selectively for a vehicle for sliding on snow, ice or water and is selectively active or passive.

* * * * *